Patented Apr. 24, 1951

2,550,491

UNITED STATES PATENT OFFICE 2,550,491

BAKING COMPOSITION

Guy A. McDonald, Chicago Heights, Ill., assignor to Victor Chemical Works, a corporation of Illinois No Drawing. Application December 23, 1947, Serial No. 793,531

14 Claims. (Cl. 99—95)

This invention relates to a baking composition, and relates particularly to a baking powder composition and a self-rising flour composition including a new baking acid. The invention also relates to a baking composition comprising a new baking acid combined with a modifier or accelerator.

This application is a continuation-in-part application of my copending application Serial No. 625,442, filed October 29, 1945. This copending application claims specifically the new complex alkali metal-aluminum or iron acid phosphates disclosed herein.

Certain alkali metal-aluminum compounds have heretofore been suggested and employed as baking acids, but prior to the present invention they have had the unfortunate property of producing a bitter taste. The present compound, on the other hand, produces tasteless products upon reaction with sodium bicarbonate.

Furthermore, as will be shown in detail, the new material produces carbon dioxide slowly by the reaction and has a high capacity for producing carbon dioxide. Products, such as biscuits, resulting from the use of this baking acid are, therefore, light and large in volume.

The new complex has the formula:

$$MM'_3H_{14}(PO_4)_8 \cdot 4H_2O$$

wherein M is an alkali metal including the ammonium radical, and M' is a trivalent metal of the class consisting of aluminum and iron.

In general, the new compounds may be prepared by reacting a reactive trivalent iron or aluminum compound such as the metal itself or its hydroxide, etc., with an excess of concentrated phosphoric acid, adding sufficient alkali metal hydroxide or carbonate to give a ratio of one atom of alkali metal to three atoms of iron or aluminum, heating the solution and boiling to concentrate it sufficiently to cause crystallization, and then cooling. The crystalline product is filtered off and washed with methanol to remove the excess phosphoric acid. The product is in the form of colorless or slightly colored plate-like hexagonal crystals having the general formula:

$$MM'_3H_{14}(PO_4)_8 \cdot 3 \text{ or } 4H_2O$$

where M represents an alkali metal or ammonium radical, and M' represents a trivalent iron or aluminum atom.

The following example illustrates the exact procedure followed in producing the sodium aluminum acid phosphate compound.

108 grams of soda ash was slowly added to 3376 grams of 75% phosphoric acid at 70° C. The solution was heated to 90° C, and 458 grams of aluminum hydrate added at such rate that the charge did not boil over. The solution was boiled down, with agitation, until the boiling point reached about 135° C. The charge became thick with crystals and was cooled to room temperature while continuing the agitation. The charge was then diluted with about two volumes of a 75% methanol-25% water (by volume) solution and filtered. The crystals were washed with a 75% methanol-water solution and finally with methanol to remove any free phosphoric acid. After drying at 70° C., the product weighed 1400 grams. Analysis of the crystals showed them to correspond to the formula:

$$NaAl_3H_{14}(PO_4)_8 \cdot 4H_2O$$

Following a similar procedure by substituting iron for aluminum and by using different alkali metal and ammonium reactants, a number of complex compounds were produced. The following table shows some of these compounds and their crystal characteristics:

| Compound | Type Crystals | Axis | Refractive Indices |
|---|---|---|---|
| $NaAl_3H_{14}(PO_4)_8 \cdot 4H_2O$ | Hexagonal Plates | Biaxial (—) | $N_x = 1.532$<br>$N_m = 1.526$<br>$N_p = 1.508$ |
| $KFe_3H_{14}(PO_4)_8 \cdot 4H_2O$ | do | do | $N_x = 1.604$<br>$N_m = 1.600$<br>$N_p = 1.564$ |
| $KAl_3H_{14}(PO_4)_8 \cdot 4H_2O$ | do | do | $N_x = 1.532$<br>$N_m = 1.530$<br>$N_p = 1.504$ |
| $(NH_4)Al_3H_{14}(PO_4)_8 \cdot 4H_2O$ | do | do | $N_x = 1.538$<br>$N_m = 1.532$<br>$N_p = 1.504$ |
| $NaFe_3H_{14}(PO_4)_8 \cdot 4H_2O$ | do | do | $N_x = 1.604$<br>$N_m = 1.600$<br>$N_p = 1.564$ |
| $NH_4Fe_3H_{14}(PO_4)_8 \cdot 4H_2O$ | do | do | $N_x = 1.610$<br>$N_m = 1.604$<br>$N_p = 1.564$ |

The crystalline compounds illustrated above are non-hygroscopic and are highly stable under normal atmospheric conditions. The compounds are slowly soluble in water and slowly hydrolyze under such conditions to give highly acidic solutions. This characteristic of the compounds makes them especially suitable for use as baking acids in baking powders, self-rising flours, and other baking preparations.

Baking tests show that the acidic hydrogen atoms of the molecule react with sodium bicarbonate in baking preparations, liberating a large amount of carbon dioxide gas for leavening purposes substantially in accord with the following equation:

$$2NaAl_3H_{14}(PO_4)_8 \cdot 4H_2O + 23NaHCO_3 \rightarrow$$
$$Na_5Al_6(PO_4)_6(OH)_5 \cdot 12H_2O + 10Na_2HPO_4 +$$
$$14H_2O + 23CO_2$$

The principal residual salt of the leavening reaction designated in the above equation by empirical formula is a complex insoluble basic phosphate, the structure of which has not been definitely established. The salt, however, is inert and does not give the baked product a bitter taste such as is normally obtained when employing commercial phosphate-alum type leavening agents.

The reaction characteristics of the new compounds in baking procedures are similar to those of the well known sodium aluminum sulfate baking acid in that they react with sodium bicarbonate slowly in dough mixtures at ordinary temperatures, retaining a large measure of leavening action for expansion of the dough at oven temperatures. For example, doughnut dough mixtures containing sufficient sodium bicarbonate and baking acid to give 200 cc. of carbon dioxide gas were mixed at 27° C. in aqueous medium, and the liberated gas measured at the end of the 2 and 15 minute periods. The results of these tests are given in the following table for the aluminum compounds:

| Baking Acid | Neutralizing Value | Reaction Rates | |
|---|---|---|---|
| | | 2 Min. | 15 Min. |
| | | Cc. | Cc. |
| $KAl_3H_{14}(PO_4)_8 \cdot 4H_2O$ | 100.4 | 35.0 | 51.5 |
| $NaAl_3H_{14}(PO_4)_8 \cdot 4H_2O$ | 102.0 | 41.6 | 58.6 |
| $NH_4Al_3H_{14}(PO_4)_8 \cdot 4H_2O$ | 108.0 | 31.8 | 44.4 |

From the table it will be observed that approximately 22 to 30% of the theoretical amount of leavening gas is liberated in the dough stage over a 15 minute period at room temperature of 27° C. The column headed "Neutralizing value" represents the amount of sodium bicarbonate required by weight to neutralize the acidity of 100 parts by weight of the baking acid.

The following table shows two self-rising flour formulas made up with two of the new baking acids, and for comparison a formula using ordinary monocalcium phosphate as the baking acid.

| | (A) Ordinary Monocalcium Phosphate | (B) Sodium Aluminum Phosphate | (C) Potassium Iron Phosphate |
|---|---|---|---|
| Sodium bicarbonate | 1.50 | 1.50 | 1.50 |
| Baking acid | 1.875 | 1.47 | 1.50 |
| Salt | 2.00 | 2.00 | 2.00 |
| Flour | 100.00 | 100.00 | 100.00 |

The proportions of sodium bicarbonate and baking acids were based on neutralizing values of 80 for (A), 102 for (B) and 100 for (C).

Biscuit bakes were made from doughs made with the above flours, using 12.0 parts of shortening and 66.2 parts of water based on 100 parts of flour. The following table shows the results of the bakes.

| | (A) | (B) | (C) |
|---|---|---|---|
| Specific volume of biscuit | 2.20 | 3.08 | 2.71 |
| pH Value of crumb | 7.19 | 7.62 | 7.75 |
| Height of 6 biscuits _____ inches | 6⅞ | 10¼ | 9½ |

The doughs for the above biscuits were mixed for 15 seconds in a "Hobart" dough mixer, rolled out to ⅜" thickness, folded double, rolled out, folded double at right angles to the first folding, rolled out to original thickness, and circular doughs cut therefrom. They were baked for 15 minutes at 450° F.

The new compounds may be suitably used in preparing baking powders by admixing sodium bicarbonate and starch with the new baking acids in proportions to give the desired available $CO_2$ content.

The new product is entirely compatible with monocalcium phosphate and the like and may be used in combinations with other baking acids to give a range of baking characteristics from the slow action of the new compounds to the fast action of the other baking acids such as hydrated monocalcium phosphate. For example, a baking powder consisting of 28% granular sodium bicarbonate, 13% hydrated monocalcium phosphate, 20% sodium aluminum acid phosphate $(NaAl_3H_{14}(PO_4)_8 \cdot 4H_2O)$, and 39% corn starch is highly stable, and represents an excellent formula for a commercial type baking powder.

For some purposes, it may be desirable to accelerate the speed of reaction of the new complex. In such cases, an accelerator or modifier may be added. The accelerator or modifier is of the phosphate type and may be such materials as monocalcium phosphate or sodium acid pyrophosphate. The added phosphate material does not affect the reaction characteristics of the new complex acid, but the mixture gives a baking acid composition with leavening characteristics between those of the two acids and also results in superior baked products that have improved characteristics over those prepared when either is used alone.

When monocalcium phosphate is used to modify the new complex acid, the monocalcium phosphate causes an early rapid leavening action, while the new complex acid phosphate contributes its late slow leavening action. The mixture of the monocalcium phosphate and the new complex acid may be merely a simple mixture. When such a mixture is used, the combination of the fast and slow acting acids provide a baking result not obtained by either component alone. A homogeneous admixture of the monocalcium phosphate and the new complex acid phosphate may be prepared by forming the monocalcium phosphate on the crystals of the new complex acid phosphate by a process described hereinafter. In so doing, the process of preparing the baking acid composition may be modified with economic advantage by preparing the new compounds as described above up to the step of removing the excess acid with an organic solvent. At this stage, instead of removing the excess phosphoric acid, it may be neutralized with hydrated lime to substantially convert the excess acid into monocalcium phosphate, thus yielding a homogeneous mixture of the baking acids in proportions controlled by the amount of excess acid employed in the first steps of the process. An example of this procedure is as follows:

1440 grams of 56.0° Bé. phosphoric acid was diluted with an equal volume of water and heated to 80° C. 145 grams of metallic aluminum was slowly added and after the reaction subsided, the mixture was heated at 90–100° C. for several hours. The impurities and excess aluminum were filtered off, and 475 grams of 56.0° Bé. phosphoric acid and 77 grams of sodium carbonate were added. The solution was concentrated by boiling until it was thick with crystals of the complex sodium aluminum acid phosphate, and the boiling point had reached 122° C. The mixture was then poured into a mixer containing 200 grams of hydrated lime. Vigorous agitation was continued until the mixture solidified into small granular lumps. It was then dried for 18 hours at about 95° C. and milled. The product was a dry, non-hygroscopic powder having a neutralizing value of 100.4. It was tested in the baking of biscuits and found to have baking characteristics equal to that of standard commercial phosphate-alum baking powders, except that it possessed the distinct advantage over the phosphate-alum baking powder of not producing a bitter astringent taste in the biscuit. Results of baking at a neutralizing value of 90 showed the baked biscuits to have a specific volume of 2.6, a pH value of 7.4, and a fine open grain structure. Excellent results were also obtained with the above new type baking acids in baking cakes and doughnuts.

When the new acid complex phosphate is combined with sodium acid pyrophosphate a superior composition is also provided. In this case, both the sodium acid pyrophosphate and the new complex acid phosphate are relatively slow baking acids. For example, the reaction rate of the new sodium aluminum acid phosphate at 38° C. is 70 cc. in two minutes and 101 cc. in fifteen minutes as compared to 88 cc. and 116 cc. for sodium acid pyrophosphate under the same conditions. In a mixture of equal parts by weight of the two baking acids, the corresponding reaction rates are 80 cc. and 113 cc. under the same conditions. Although this reaction rate appears to be very close to what would be expected in such a combination, the use of the mixture in baking preparations results in obtaining improved qualities in the baked goods. For example, in the cooking of doughnuts a better quality product is obtained with mixtures of the two acids than with either alone. A typical doughnut formula was prepared with 100 parts flour, 7 parts dried milk solids, 38.2 parts sugar, 4.6 parts powdered egg yolk, 1.16 parts salt, 5.6 parts shortening and 0.4 part spices. To this mixture were added sodium bicarbonate and baking acids. To the completed mixtures 70 parts of water were added and the materials mixed to form a batter. Standard size doughnut doughs were cut and then fried in deep fat. Tests were made using commercial sodium acid pyrophosphate, the new sodium aluminum acid phosphate, and mixtures of these two baking acids. Using 1.3 parts of sodium bicarbonate per 100 parts of flour in the above formula and amounts of baking acids corresponding to neutralizing values of 70 for sodium acid pyrophosphate, 115 for the sodium aluminum acid phosphate, and 100 for mixtures of equal parts by weight of the two baking acids, a series of doughnuts were prepared having the following properties:

| Baking Acid | Sodium Acid Pyrophosphate | Sodium Alum. Acid Phosphate | 50/50 mixt. by weight |
|---|---|---|---|
| Spec. Volume of doughnut | 3.17 | 3.11 | 3.16. |
| Gain in weight, per cent (Absorption of cooking oil) | 9.5 | 4.6 | 4.8. |
| pH value of crumb | 8.35 | 8.20 | 8.45. |
| Symmetry | very good | very good | excellent. |
| Star center | do | do | Do. |
| Crust | smooth | sl. rough | smooth. |
| Grain | very good | fine open | excellent. |
| Texture | do | soft | Do. |
| Taste | sl. bitter | excellent | Do. |

A further test with the 50/50 mixture using 10% less baking acids and sodium bicarbonate gave quality results equivalent to those of the 50/50 mixture in the above table, except that the specific volume was slightly lower, being 3.05 instead of 3.16.

Using a mixture of 75% sodium aluminum acid phosphate and 25% sodium acid pyrophosphate with a 20% reduction in the leavening ingredients, the doughnut quality was substantially the same as that of the example in the above table where the sodium aluminum acid phosphate was used on a 100% leavening basis, except that the specific volume was reduced to 2.92.

The above quality tests represent the consensus of several observers on unidentified samples, and therefore shows a distinct quality improvement in the use of the mixed baking acids.

The term "accelerator" or "modifier" is intended to mean that the combination with the new complex acid phosphate results in faster reaction rates for the mixtures than are obtained when the new complex acid phosphates are used alone.

The foregoing detailed description has been given for clearness of understanding only, and no unnecessary limitations should be understood therefrom.

I claim:

1. A baking powder composition comprising sodium bicarbonate, starch, and a baking acid, a substantial proportion of which is a complex crystalline compound having the formula:

$$MM'_3H_{14}(PO_4)_8 \cdot 4H_2O$$

wherein M represents a member of the class consisting of sodium, potassium and ammonium and M' represents a trivalent metal atom of the class consisting of aluminum and iron.

2. A baking powder as set forth in claim 1 in which the baking acid complex has the formula:

$$NaAl_3H_{14}(PO_4)_8 \cdot 4H_2O$$

3. A baking powder composition as set forth in claim 1 in which the baking acid is a mixture of hydrated monocalcium phosphate and a compound of the formula $NaAl_3H_{14}(PO_4)_8 \cdot 4H_2O$.

4. A baking powder composition as set forth in claim 1 in which the baking acid is a mixture of sodium acid pyrophosphate and a compound of the formula $NaAl_3H_{14}(PO_4)_8 \cdot 4H_2O$.

5. A baking powder composition comprising a mixture of approximately 28 parts by weight of sodium bicarbonate, 39 parts corn starch, 13 parts monocalcium phosphate, and 20 parts sodium aluminum acid phosphate having the formula:

$$NaAl_3H_{14}(PO_4)_8 \cdot 4H_2O$$

6. A self-rising flour composition comprising flour, salt, sodium bicarbonate, and a leavening proportion of a baking acid, a substantial proportion of which is a crystalline compound having the formula:

$$MM'_3H_{14}(PO_4)_8 \cdot 4H_2O$$

wherein M represents a member of the class consisting of sodium, potassium and ammonium and M' represents a member of the class consisting of aluminum and iron.

7. A self-rising flour composition as set forth in claim 6 in which the baking acid has the formula $$NaAl_3H_{14}(PO_4)_8 \cdot 4H_2O$$

8. A self-rising flour as set forth in claim 6 in which the baking acid is a mixture of hydrated monocalcium phosphate and a compound having the formula $NaAl_3H_{14}(PO_4)_8 \cdot 4H_2O$.

9. A self-rising flour as set forth in claim 6 in which the baking acid is a mixture of sodium acid pyrophosphate and a compound having the formula $NaAl_3H_{14}(PO_4)_8 \cdot 4H_2O$.

10. A crystalline acidic compound having the formula $$MM'_3H_{14}(PO_4)_8 \cdot 4H_2O$$

having intimately admixed therewith a substantial proportion of an acid accelerator of the class consisting of hydrated monocalcium phosphate and sodium acid pyrophosphate.

11. A compound as set forth in claim 10 in which the accelerator is hydrated monocalcium phosphate.

12. A compound as set forth in claim 10 in which the accelerator is hydrated monocalcium phosphate and the proportion of complex to monocalcium phosphate is approximately 60 to 40.

13. A compound as set forth in claim 10 in which the accelerator is sodium acid pyrophosphate.

14. A compound as set forth in claim 10 in which the accelerator is sodium acid pyrophosphate and the proportion of complex to the sodium acid pyrophosphate is approximately 50 to 50.

GUY A. McDONALD.

REFERENCES CITED

The following references are of record in the file of this patent:

UNITED STATES PATENTS

| Number | Name | Date |
|--------|------|------|
| 1,113,632 | Holbrook | Oct. 13, 1914 |

OTHER REFERENCES

U. S. Circular 138, revised Feb. 1931, page 7.

Mellor: Comprehensive Treatise on Inorganic and Theoretical Chemistry, Longmans, Green and Co., New York, vol. 5, 1924, page 367; vol. 14, 1935, pages 409 and 410.